United States Patent [19]

Harben, III et al.

[11] Patent Number: 4,951,352
[45] Date of Patent: Aug. 28, 1990

[54] APPARATUS AND PROCESS FOR HARVESTING HEARTS AND LIVERS OF POULTRY

[75] Inventors: Grover S. Harben, III; Gene Petty, both of Gainesville; Jerry Sosbee, Lula, all of Ga.

[73] Assignee: Grover S. Harben, III, Gainesville, Ga.

[21] Appl. No.: 473,900

[22] Filed: Feb. 2, 1990

[51] Int. Cl.[5] ............................................ A22C 11/00
[52] U.S. Cl. .......................................... 17/11; 17/52
[58] Field of Search ................................ 17/11, 52, 45

[56] References Cited

U.S. PATENT DOCUMENTS

| Re. 32,402 | 4/1987 | Graham et al. | 17/11 |
|---|---|---|---|
| 3,663,991 | 5/1972 | Harben, Jr. | 17/11 |
| 3,902,221 | 9/1975 | Harben, Jr. et al. | 17/11 |
| 3,927,440 | 12/1975 | Sindler et al. | 17/52 |
| 4,466,158 | 8/1984 | DeLong | 17/52 |
| 4,561,148 | 12/1985 | Bonuchi et al. | 17/11 |

Primary Examiner—Willis Little
Attorney, Agent, or Firm—Jones, Askew & Lunsford

[57] ABSTRACT

A process and apparatus for mechanized separation of the heart and liver from slaughtered poultry. The apparatus is located alongside an existing overhead conveyor and includes a secondary conveyor which engages a portion of the gut extending from the eviscerated bird to a viscera package including the gall, the liver, and the heart and lungs. A pair of guide fingers define a channel for receiving the connective tissue attaching the heart to the liver, and a first rotary knife positioned alongside that channel severs the connective tissue. A second rotary knife severs the liver from the gall without cutting the gall or releasing the bile within. A pair of helical rollers separates the mutually connected heart and lungs.

27 Claims, 5 Drawing Sheets

APPARATUS AND PROCESS FOR HARVESTING HEARTS AND LIVERS OF POULTRY

TECHNICAL FIELD

This invention relates in general to poultry processing, and relates in particular to an apparatus and process for separating the heart and liver from the viscera of slaughtered poultry.

BACKGROUND OF THE INVENTION

When chickens and other poultry are slaughtered and processed on a commercial scale for human consumption, each bird typically passes through an eviscerator which automatically removes the viscera from within the body cavity of each bird. The removed viscera initially remains attached to the bird, and stays on the outside of the carcass for a time as the birds travel along an overhead conveyor line conventional to commercial poultry processing operations. The removed viscera of each bird is immediately inspected to assure that the birds are not diseased, and then certain parts of the viscera are harvested for human consumption. These parts typically include the heart and the liver of the bird.

In the past, it has been necessary to separate the heart and liver by hand from the rest of the viscera traveling along the conveyor line with each bird. This has been accomplished by a line operator who manually removes a viscera "package" comprising the heart with attached lungs, the liver, and the gall attached to the outside of the liver. The operator is required to isolate this package by hand and then cuts loose the package from the remaining viscera, as each bird moves past the operator on the line. This removed viscera package then is manually cut into individual parts to yield the heart and the liver for human consumption. The gall is unfit for human consumption and must be severed from the liver with great care so as to avoid releasing the bile, an unpleasant greenish liquid contained within the gall. These steps required for manual isolation and separation of the heart and liver obviously are labor-intensive. Moreover, these manual efforts demand repetitive wrist and hand motions which are believed to cause chronic painful symptoms in some operators.

SUMMARY OF THE INVENTION

Stated in general terms, the parts making up the visceral package are isolated from the remainder of the visceral parts removed from each bird without initially cutting loose the viscera package from the bird. The viscera package then is extended from the bird so that certain portions of the viscera package extend outwardly from the bird along an elongate path. This extended viscera package includes, extending from the gut of the bird, the gall, the liver attached to the gall by connective tissue, the heart attached to the liver by connective tissue, and the lungs which at this time remain attached to the heart. These parts all are connected together one after the other and to the remaining gut of the bird by connective tissue. The extended viscera package next is moved along a predetermined path in close proximity to the bird moving along the conveyor line, inasmuch as the viscera package still remains attached to the bird. Guide elements select certain parts of the viscera package to traverse predetermined paths as the viscera package moves with the bird, and cutting devices are positioned adjacent the paths to sever the combined heart and lungs and the liver from the remainder of the viscera package. Any remaining parts of the viscera package continue to move with the bird along the conveyor line, after the selected portions of the viscera package are thus severed.

Stated somewhat more particularly, the present invention includes a secondary conveyor which engages the extended viscera package and moves that package along a path generally alongside the path traveled by the bird suspended from the conventional overhead conveyor. At least one guide member is provided in relation to the secondary conveyor so as to engage a first part of each viscera package moved by the secondary conveyor. This guide member preferably isolates the interconnected heart and lungs comprising a subpackage, so that the heart and lungs move toward a first knife positioned adjacent the guide member. The first knife severs the connective tissue between the heart and the remainder of the viscera package, freeing the heart and lungs for subsequent separation of heart from lungs by manual or mechanized techniques forming no part of the present invention. The apparatus includes a second knife positioned to sever the gall from the liver as the secondary conveyor moves the viscera package to a predetermined second cutting location. The second knife may cut slightly into the liver itself instead of cutting through the connective tissue which closely attaches the liver to the gall, so as to decrease the likelihood of cutting into the gall and releasing the bile therefrom.

Stated with somewhat greater detail, the present invention includes a wall extending along a portion of the overhead conveyor line for the birds, with the secondary conveyor moving along an upper extent of the wall. The bird carcasses and the viscera packages are placed to move along opposite sides of the wall, so that a portion of the connective tissue attaching the viscera packages to the birds is received on the secondary conveyor. A guide bar is placed in closely-spaced relation above the secondary conveyor and holds the connective tissue in contact with the secondary conveyor to assist in moving the viscera package forwardly as the bird moves along the overhead conveyor. At least one guide member disposed at a side of the secondary conveyor defines a path for guiding the attached heart and lung subpackage to the first knife, which preferably is a rotary knife, to sever the connecting tissue attaching the heart to the remainder of the viscera package. A second knife likewise preferably comprising a second rotary knife operates to sever the liver from the gall and the remainder of the viscera package. The severed heart and lungs are then separated from each other by means of a helical-roller separator.

Accordingly, it is an object of the present invention to provide an improved process for separating the heart and liver from the viscera of poultry carcasses.

It is another object of the present invention to provide apparatus for mechanically separating the heart and liver from such viscera.

It is still another object of the present invention to provide a process and an apparatus for the mechanized separation of the heart and liver from freshly-slaughtered poultry.

Other objects and advantages of the present invention will become more readily apparent from the following description of a preferred embodiment.

DETAILED DESCRIPTION OF THE PREFERRED EMBODIMENT

Figure 1:
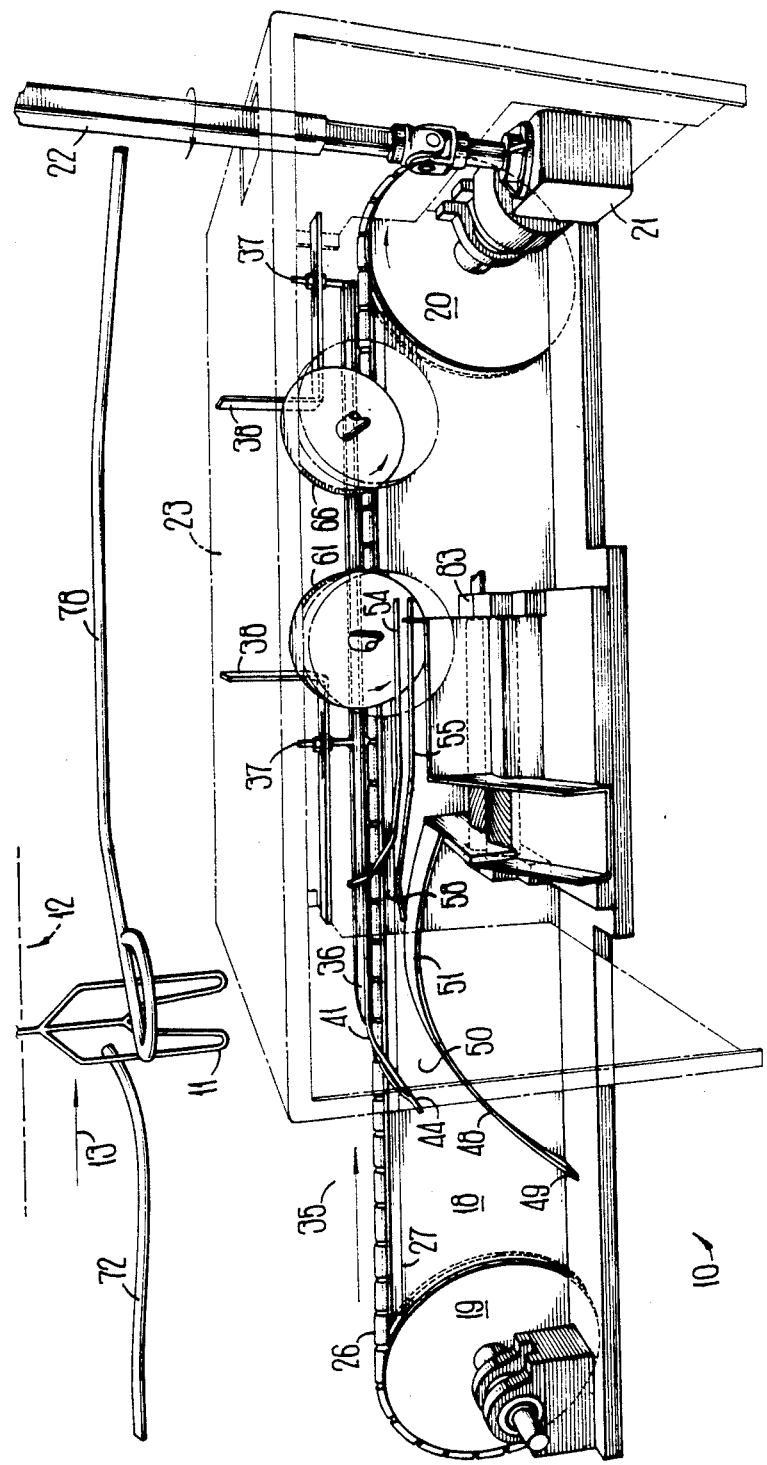
FIG. 1 is a front perspective view, shown partly in phantom, of apparatus according to a preferred embodiment of the present invention.

Turning first to FIG. 1, there is shown generally at 10 an apparatus for harvesting the hearts and livers from the viscera of birds suspended from the shackles 11 of a conventional overhead conveyor line 12. The apparatus 10 is shown in place at one side of the path of travel, indicated by the arrow 13, of birds 14 (FIG. 2) held by the shackles 11, so that the birds pass alongside and behind the apparatus 10 on the back side thereof as viewed in FIG. 1. It will be understood by those skilled in the art that the apparatus 10 is placed a short distance downline along the overhead conveyor 12 from a conventional eviscerator, so that the birds 14 arrive at the apparatus soon after the viscera is removed from the carcass and inspected for health purposes.

Figure 2:
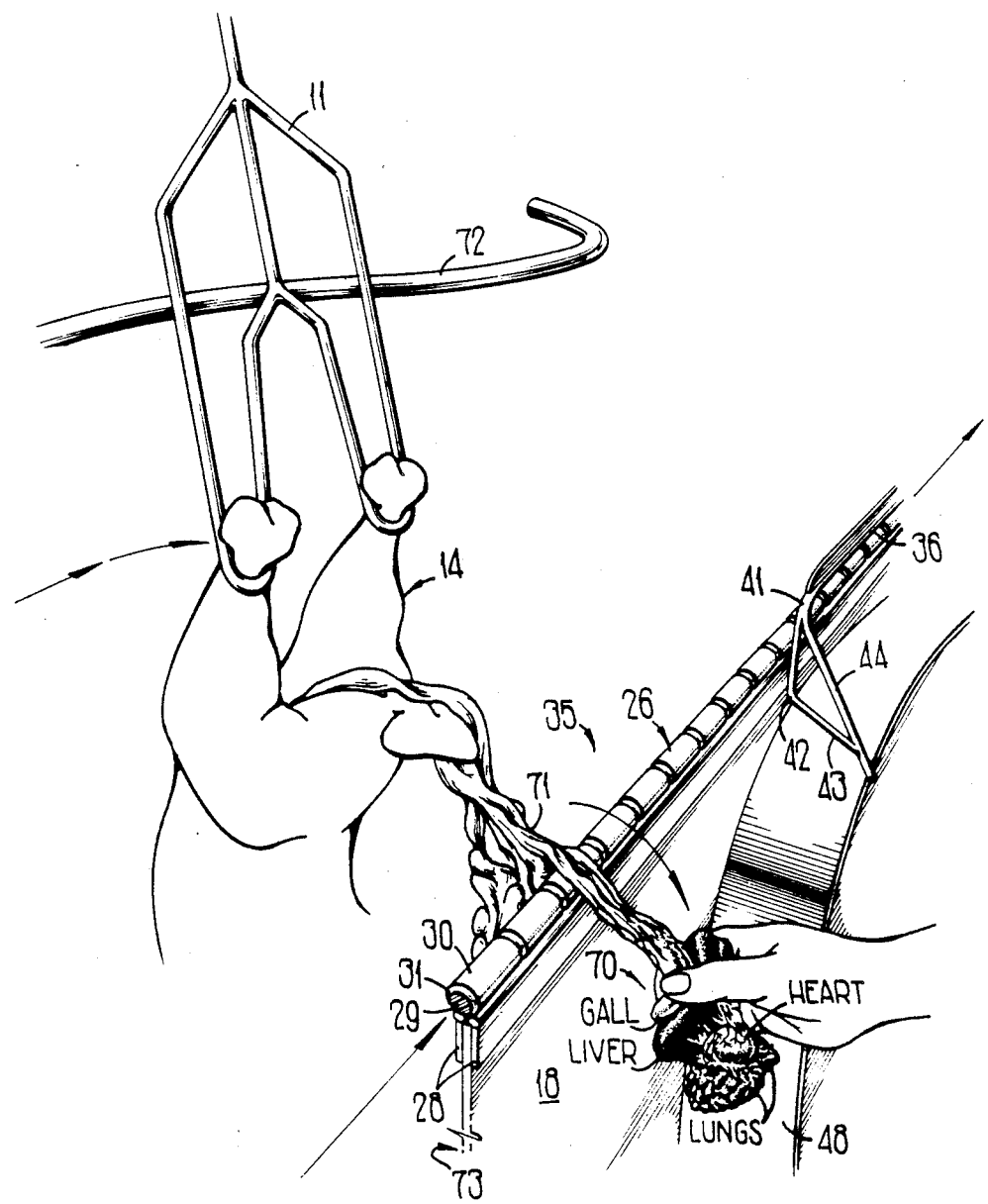
FIG. 2 is a fragmentary pictorial view of the apparatus shown in FIG. 1, detailing the viscera package and depicting the introduction of the elongated viscera package into the apparatus.

The apparatus 10 includes a vertical wall 18 elongated in the horizontal direction. The vertical plane of this wall is at one side of the path traveled by the birds 14, as best seen in FIG. 2. The left and right ends of the wall 18 are concave to accommodate the idler wheel 19 and the drive wheel 20 of a secondary conveyor forming part of the present apparatus. The drive wheel 20 is mounted on a horizontal shaft connected through a right-angle drive 21 to the drive shaft 22, which extends upwardly through the housing 23 to connect with a sprocket (not shown) engaging the moving chain of the overhead conveyor 12. The drive wheel 20 thus rotates in synchronism with the speed of the overhead conveyor 12 as that conveyor operates.

The periphery of the idler wheel 19 and the drive wheel 20 is concave to receive the flexible secondary conveyor belt 26 extending between those two wheels. The belt 26 extends along the upper edge 27 of the wall 18, sliding along a channel defined by the two beaded members 28 (FIG. 2) attached at the sides of the upper edge. The belt 26 has an inner core 29 providing structural strength and dimensional stability, surrounded by an outer sheath 30 preferably of an inert elastomeric material for promoting sliding engagement with the beaded members 28. The sheath 30 preferably is impervious to liquid for ease of cleaning. This sheath has necked portions 31 at intervals along its length, giving the sheath greater flexibility for turning around the wheels 19 and 20.

The idler wheel 19 and a portion of the wall 18 extend outwardly from the left side of the housing 23 and constitute an entry region 35 for viscera packages of birds arriving at the apparatus 10, as will become apparent below. To the right of the entry region 35, a guide bar 36 is located immediately above the belt 26 of the secondary conveyor. The guide bar 36 is supported by a pair of threaded rods 37 extending upwardly from the guide bar to engage the brackets 38 supported by the housing 23. Each bracket 38 has an elongated slot substantially parallel with the path of travel of the secondary conveyor belt 26, permitting adjustment of the guide bar in longitudinal and parallel relation to the secondary conveyor belt. The rods 37 are secured to the slotted brackets by nuts for adjusting the vertical spacing between the secondary conveyor belt 26 and the underside of the guide bar. The preferred vertical spacing of the guide bar 36 above the secondary conveyor belt provides a gap slightly less than the typical thickness of the viscera part extending across the secondary conveyor belt, as illustrated in FIG. 3 and explained below in greater detail.

The forward or entry end of the guide bar 36 is bent downwardly and away from the upper edge of the wall 18 at 41, as best seen in FIG. 2, to extend below and outwardly from the secondary conveyor belt 26. The guide bar is bent further outwardly at the foremost leading end 42 to provide a lead-in finger 43 extending outwardly from the wall 18 at a substantial angle to that wall. A rod 44 extends from the outer end of the lead-in finger 43 back up to guide bar 36 at the vicinity of the downward bend 41 of the guide bar 36, to provide rigidity and support for the lead-in finger.

Turning again to FIG. 1, it is seen that the forward end of the guide bar 36 is located above a curved ramp 48 having a smooth surface substantially perpendicular to the vertical wall 18. The inner edge of the ramp 48 adjoins the wall 18 and may be attached to that wall. The forward end 49 of the ramp is located well below and in front of the forward end of the guide bar 36. The ramp 48 curves upwardly while extending rearwardly from the forward end, and defines a space 50 between the ramp and the underside of the downwardly-extending forward end of the guide bar 36. The ramp 48 has a maximum elevation at 51 located a short distance rearwardly from the forward end 41 of the guide bar 36, and gradually turns downwardly as the ramp extends rearwardly from the maximum elevation point.

Figure 3:
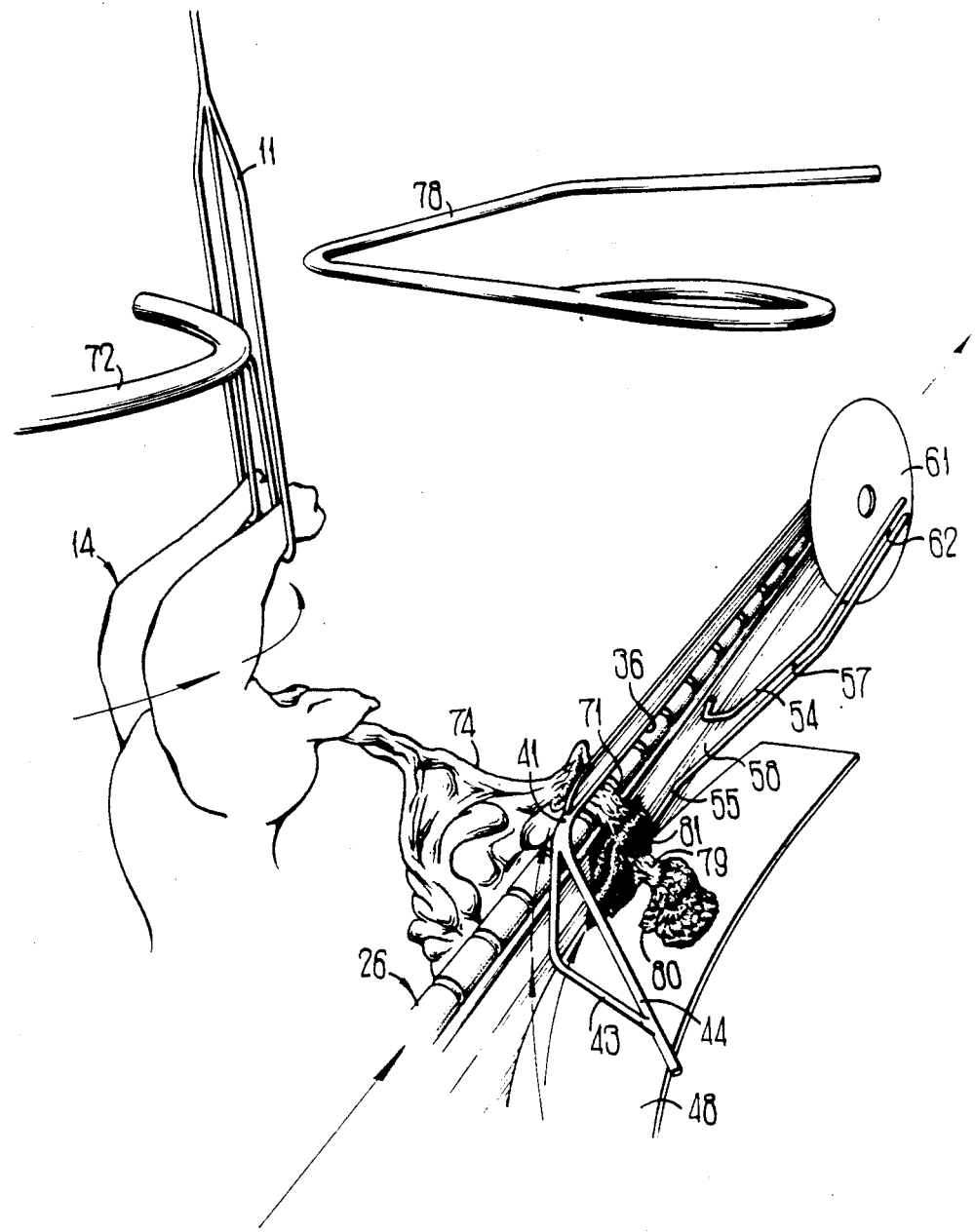
FIGS. 3, 4, and 5 each are fragmentary pictorial views showing the further progress of the viscera package seen in FIG. 2 through the present apparatus in selected steps of the present process.
Figure 4:
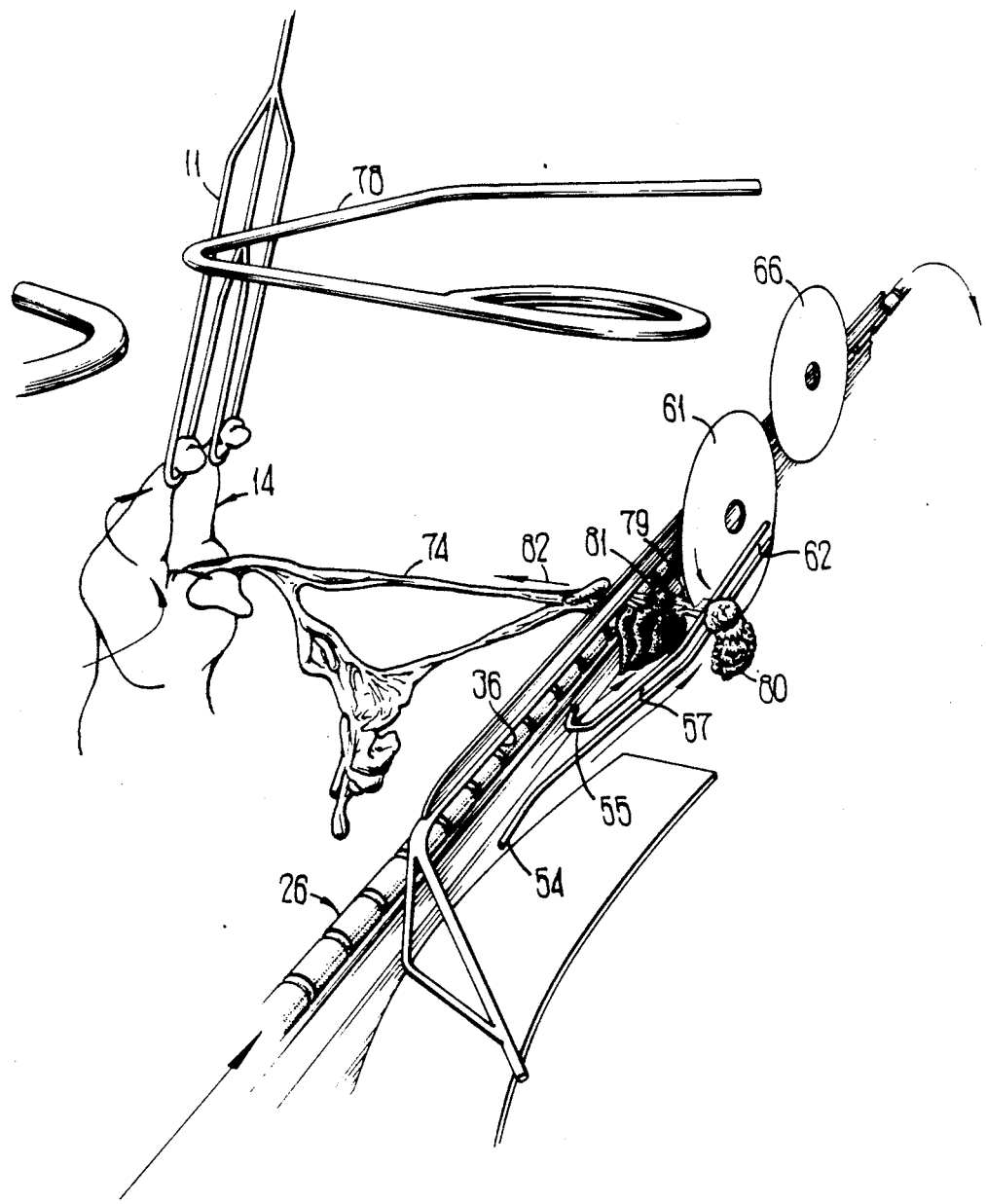

A pair of guide fingers 54 and 55, best seen in FIGS. 3 and 4, are supported within the housing 23 spaced laterally outwardly from the wall 18 and from the secondary conveyor belt 26 at the top of the wall. The guide fingers 54 and 55 are arrayed one above the other in spaced-apart relation to define a generally-horizontal channel 57 extending between the two guide fingers. The channel 57 is open at both ends, and the forward ends of the guide fingers 54 and 55 are flared outwardly to form the entry throat 58 leading into the channel. The width of the channel 57 is sufficient to permit entry and passage of the connective tissue joining the heart and lungs to the liver, but not of those organs themselves as detailed below. The entry throat 58 is located a short distance behind the point of maximum elevation 51 on the ramp 48, as best seen in FIG. 1.

A first rotary knife 61 is positioned in a vertical plane near the back ends 62 of the channel 57 between the guide fingers 54 and 55. The rotary knife 61 is located in the space between the guide fingers 54, 55 and the wall 18, and the first rotary knife lies immediately alongside the guide fingers so that any portion of the viscera package moving through the channel becomes severed in close proximity to the channel. The first rotary knife 61 is mounted on a shaft driven at high speed by a motor (not shown) in a manner known to those skilled in the art. A helical-roller separator 83 is located substantially below the first rotary knife 61.

A second rotary knife 66 similar in nature and operation to the first such knife 61 is located a distance downline from the first such knife, measured in the direction of movement of the secondary conveyor. The second rotary knife 66 is located beyond the backend 62 of the guide fingers 54, 55 and is located in lateral spaced relation to the wall 18 and the secondary conveyor belts 26 at the top of the wall. However, unlike the first rotary blade 61, the second rotary blade 62 is in close lateral proximity to the wall 18. The second rotary blade 66 is mounted on a shaft driven for rotation by a suitable motor.

The present process is now described referring to the operation of the apparatus 10. Birds 14 suspended from shackles 11 arrive with their viscera removed but remaining attached to the bird, in the conventional manner known to those skilled in the art. As seen in FIG. 2, an operator in front of the entry region 35 manually grasps a viscera package 70 comprising the lungs and attached heart, the liver, and the gall attached to one side of the liver, and pulls that viscera package over the wall 18 and the secondary conveyor belt 26 to lie on the ramp 48 on the side of the wall opposite the birds 14. The gut 71 extending from the gall remains attached to the bird 14, and part of this gut is placed over the secondary conveyor 26 as the operator moves the viscera package 70 to the position shown in FIG. 2. The shackle 11 suspending the bird 14 at this time contacts a first rail 72 acting as a cam to tip the shackle and bird closer to the backside 73 of the wall 18 as the bird approaches the entry region 35, thereby moving the viscera package 70 closer to the operator for ease of pulling the viscera package across the wall and laying the gut 71 over the secondary conveyor belt 26.

After the viscera package is placed on the ramp 48 with the gut 71 laying on the secondary conveyor belt 26, continued forward motion of the bird 14 and of the secondary conveyor belt draws the gut into the space between the stationary guide bar 36 and the secondary conveyor belt. The downward and outward location of the lead-in finger 43 of the guide bar 36 assists the gut 71 in moving beneath the guide bar. The gut 71 thus becomes somewhat compressed and flatten between the underside of the guide bar and the confronting surface of the secondary conveyor belt 26, so that the secondary conveyor belt urges the gut 71 forwardly and moves the viscera package 70 through the apparatus.

Continued forward motion of the secondary conveyor 26 moves the viscera package 70 toward the entry throat 58 at the forward ends of the guide fingers 54 and 55, a condition best illustrated in FIG. 3. At this stage in the process, the shackle 11 has moved beyond the first rail 72 so that the shackle and the suspended bird 14 can return to a vertical attitude which tends to stretch the gut connecting the bird to the viscera package as shown at 74. The shackle 11 at this time is approaching a second rail 78 that will tip the shackle and the bird away from the wall 18, as described below.

The heart and lungs of the viscera package 70 are connected to the liver by the connective tissue 79, shown in FIG. 3. The entry throat 58 of the channel 57 is positioned for alignment with the connective tissue 79, such that continued forward motion of the viscera package moves the connective tissue through the entry throat 58 and into the channel 57 for movement toward the first rotary knife 61. After the connective tissue 79 enters the channel 57 as shown in FIG. 4, the heart 80 and lungs are on the outside of the channel 57 while the liver 81 remains on the inside of that channel, that is, within the lateral space between the wall 18 and the guide fingers 54, 55 defining the channel. As also seen in FIG. 4, further forward movement of the shackle 11 has placed that shackle into contact with the second rail 78, providing a camming surface which swings the shackle outwardly away from the apparatus 10 and further stretches the gut 74 extending between the viscera package and the bird 14. This stretching action, as indicated by the arrow 82 in FIG. 4, draws the gall and attached liver closer to the wall 18 and to the secondary conveyor belt 26. The heart and liver 80 are laterally constrained by the guide fingers 54, 55 at this time, because the channel 57 between those guide fingers is too small to permit passage therethrough of the heart and liver. The connective tissue 79 extending between the heart and lungs 80 and the liver 81 thus is somewhat stretched as that connective tissue encounters the first rotary knife 61, allowing that knife to sever the connective tissue without damaging the liver or the heart. The severed heart 80 and attached lungs drop downwardly to enter the helical separator 83, FIG. 1, which operates to separate the heart from the lungs.

The separator 83 comprises a pair of helical rollers 88 mounted side-by-side and driven in counter-rotation tending to draw objects into the nip or space between the rollers. The helical rollers 88 preferably are more aggressive than helical rollers associated with gizzard splitters and similar apparatus of the prior art, such that the rollers pull the lungs 84 downwardly between the roller sand also bite off the tips of the heart 80. The heart remains on the rollers 88, and the helical pitch of the rollers carries the heart to one end for removal. The degree of aggressiveness of the helical rollers 88 is determined by one or more of the helix angle of the teeth on the rollers, the diameter of the rollers, and other factors known to those skilled in the art.

Figure 5:
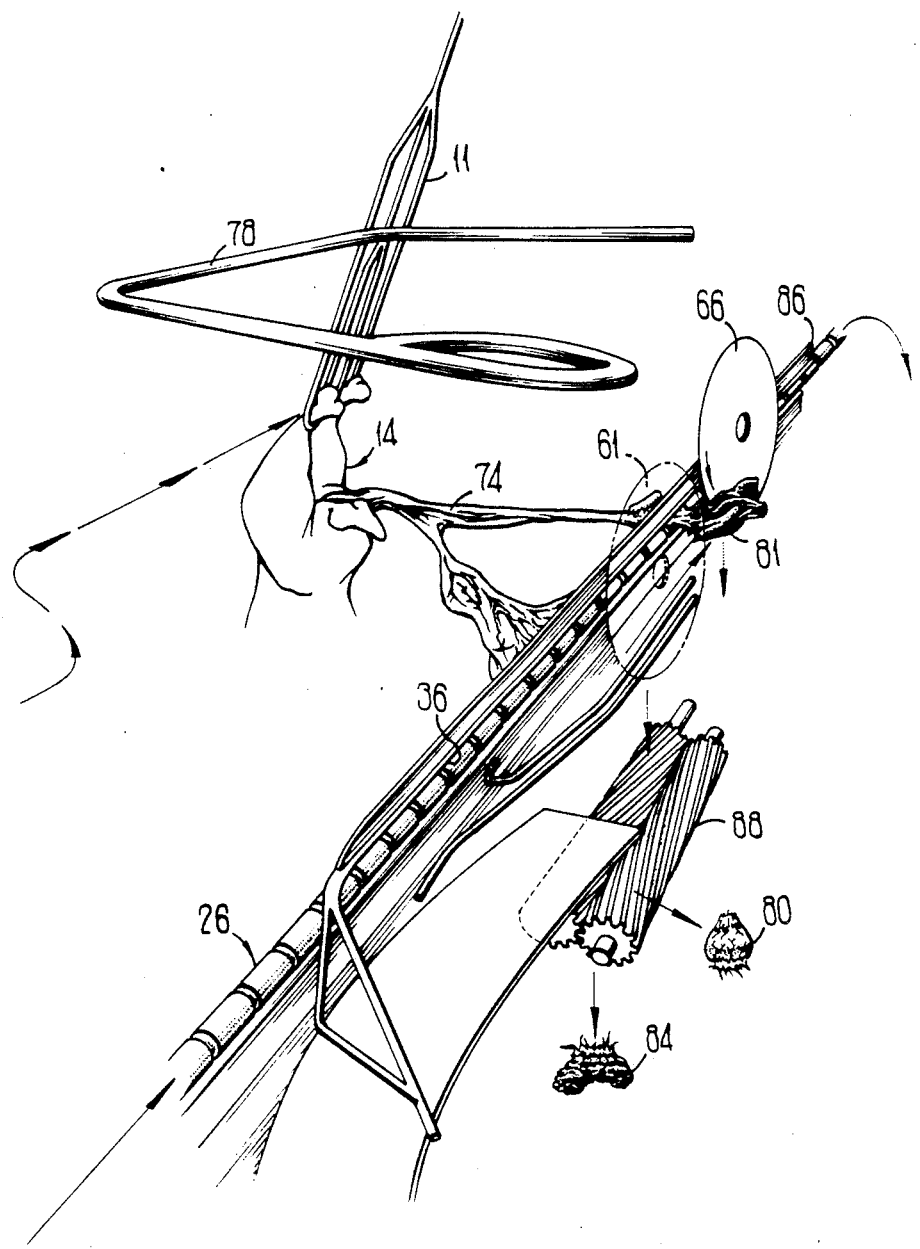

After the heart and lungs are separated from the viscera package, the secondary conveyor 26 moves the remainder of the viscera package toward the second rotary knife 66 as shown in FIG. 5. At this time, the shackle 11 remains tilted away from the wall 18 by the second rail 78, maintaining force on the connective tissue 74 beneath the guide bar 36 which elongates that connective tissue and urges the gall and the liver 81 toward the guide bar. The remainder of the viscera package thus arrives at the second rotary knife 66 with the gall far enough to the left of that rotary knife to avoid being cut as the rotary knife separates the liver 81 from the gall. Because the gall is closely attached to the surface of the liver, it may be desirable to position the second rotary knife for cutting through an adjacent part of the liver itself instead of attempting to cut precisely through the connective tissue joining the gall to the liver. Although a small fragment of each liver remains with the separated gall and is lost, this procedure assures that the gall is not cut when the liver is severed from the remaining portions of the viscera package.

The liver severed by the second rotary knife 66 falls downwardly as indicated in FIG. 5 and may be collected by a conveyor or other suitable apparatus for trimming or other final processing. The secondary conveyor belt 26 carries the connective tissue 79 beyond the second rotary knife 66 to the back end 86 of the guide bar 36, thereby freeing the connective tissue and attached gall from the apparatus 10 so that the remaining portions of the viscera can travel with the bird to subsequent work stations along the overhead conveyor line.

It should now be apparent that the present apparatus and process permits separating the heart and liver from the viscera without requiring any manual cutting or severing operations, and performs those operations on the viscera of each bird as the birds move along a poultry processing line.

Although the embodiment shown and described is generally linear in construction and is intended for installation and operation along a straight section of an overhead conveyor, it is contemplated that other embodiments of the present invention are practicable. For example, apparatus embodying the present invention could rotate approximately 180° in conjunction with a similar semicircular path of the overhead conveyor, with the heart and liver being separated from each bird as the bird travels in the semicircular path.

It should also be apparent that the foregoing relates only to a specific embodiment of the present invention, and that numerous changes and modifications therein may be made without departing from the spirit and scope of the following claims.

What is claimed is:

1. A process for separating visceral parts of poultry carcasses moving along a conveyor line, comprising the steps of:
   defining a package of interconnected viscera parts withdrawn from the carcass but remaining attached to the carcass by connective tissue;
   moving the viscera package with the carcass for a distance;
   selecting a certain first part of the viscera package to traverse a first product path as the viscera package moves with the carcass;
   selecting at least one certain other part of the viscera package to traverse a second product path as the viscera package moves with the carcass;
   severing the first part from the viscera package on the first product path; and
   severing the other part from the remainder of the viscera package on the second product path,
   so that any remaining parts of the viscera package can continue to move with the carcass along the conveyor line after moving said distance.

2. The process as in claim 1, wherein the step of severing a first part comprises severing the mutually-attached heart and lungs from the viscera package; and then
   moving the mutually-attached heart and lungs onto a pair of counter-rotating helical blades mounted in opposed facing relation so that the lungs are drawn downwardly between the rollers while the heart remains on the rollers.

3. The process as in claim 1, wherein:
   the first part is severed as the viscera package reaches a certain first location while moving with the carcass; and
   the other part subsequently is severed as the remainder of the viscera package reaches a certain second location while moving with the carcass.

4. The process as in claim 1, wherein:
   the step of selecting the certain first part includes selecting the heart and lungs of the viscera; and
   the step of selecting at least one certain other part includes selecting the liver.

5. The process of claim 4, wherein:
   the step of severing the other part comprises cutting the liver near the point where the gall connects to the liver, so as to separate the liver from the gall and remaining parts of the viscera without cutting into the gall itself.

6. A process for selecting and separating visceral parts of poultry carcasses from packages of interconnected visceral parts withdrawn from the carcasses but remaining attached to the carcasses by connective tissue as the carcasses move along a conveyor line, comprising the steps of:
   providing a barrier extending alongside a portion of the conveyor line between the carcasses and the attached viscera packages;
   placing the carcasses and viscera packages along opposite sides of the barrier so that the package including the heart and lungs, connective tissue joining the heart to the liver, connective tissue joining the liver to the gall, and further connective tissue joining the gall to the remainder of the package, are substantially extended on one side of the barrier;
   defining a path on the one side of the barrier positioned so that the connective tissue joining the heart to the liver enters the path;
   cutting the connective tissue between the heart and the liver as the package moves along the path, thereby separating the heart and lungs from the remainder of the viscera package moving along the barrier; and
   cutting the liver from the remainder of the viscera package as the package moves along the path, thereby separating the liver from the viscera package and freeing any remaining parts of the viscera to move with the carcass beyond the barrier.

7. The process as in claim 6, further comprising:
   separately conveying each viscera package along the path as the carcasses are conveyed along the other side of the barrier.

8. The process as in claim 6, wherein the step of cutting between the liver and the remainder of the viscera package comprises cutting through the liver adjacent but apart from the gall,
   so that substantially the entire liver is removed from the package without cutting the gall.

9. The process as in claim 8, wherein the last-mentioned step of cutting comprises:
   conveying each viscera package with the liver positioned in certain relation to engage a cutting element,
   so that the cutting element cuts through the liver adjacent to but apart from the connective tissue between the liver and the gall and thereby separates substantially the entire liver from the package without penetrating the gall.

10. The process as in claim 6, comprising the further step of:
    urging the viscera package in a direction lateral to the path as the connective tissue enters that path; and
    constraining the heart from lateral movement across the path, so that the step of urging draws the heart into close proximity to one side of the path,
    so that the step of cutting the connective tissue takes place without cutting into the heart.

11. The process as in claim 10, wherein the step of cutting the connective tissue takes place on the other side of the path.

12. The process as in claim 6 wherein:

the viscera package is attached to the carcass by a portion of gut extending over the barrier; and comprising the further steps of:

conveying the connective gut along the barrier while constraining the viscera package from lateral movement, so that the gall and other parts of the viscera package remain on the one side of the barrier; and urging the connective gut in a direction lateral to the conveyance along the barrier so that the viscera package is drawn into predetermined position for movement to the cutting steps.

13. Apparatus for separating at least one part from packages of viscera parts withdrawn from poultry carcasses moving along a conveyor line but remaining attached to the carcasses by connective tissue, comprising:

secondary conveyor means extending along a portion of the conveyor line to receive the viscera packages and operative to move the connected viscera packages along a certain path;

guide means disposed in predetermined relation to the secondary conveyor means and operative to engage a first part of each viscera package moved by the secondary conveyor means;

first cutting means in predetermined relation to the guide means so as to sever the first part from the viscera package; and second cutting means spaced apart from the first cutting means and in predetermined relation to the guide means so as to sever a second part from the viscera packages, so that any remaining parts of the viscera packages can thereafter leave the secondary conveyor and move with the carcasses along the conveyor line.

14. The apparatus as in claim 13, wherein:

the secondary conveyor means comprises a belt moving along a certain path in fixed relation to the portion of the conveyor line, so that part of the connective tissue between the viscera package and the carcass contacts the belt; and a guide member disposed along the flexible member in spaced apart relation thereto so that the connective tissue on the flexible member is moved between the guide member and the belt, so that the guide member urges the connective tissue against the belt to maintain movement of the viscera package to the first and second cutting means.

15. The apparatus as in claim 14, wherein:

the guide member comprises a fixed member maintained in the spaced apart relation to the moving belt, such that the connective tissue enters the space between the moving and fixed elements and is constrained to that space while being drawn along by the moving belt.

16. The apparatus as in claim 15, wherein:

the first and second cutting means are at corresponding first and second locations along the guide member;

the first cutting means having a first lateral spacing from the guide member and the second cutting means having a second lateral spacing less than the first such spacing, so that the first part from the viscera package encounters and is cut by the first cutting means before the remaining second part is moved to and is cut by the second cutting means.

17. The apparatus as in claim 15, wherein:

the first cutting means comprises a first rotary knife in lateral spaced relation to the guide member and the moving belt so as to sever the first part from each viscera package arriving at the first rotary knife; and the second cutting means comprises a second rotary knife located alongside the guide member and the moving belt downline from the first rotary knife, the second rotary knife being laterally closer to the guide member and the moving belt than the first rotary knife so as to sever the second part from each viscera package arriving at the second rotary knife.

18. Apparatus for separating at least one part from packages of selected viscera parts withdrawn from poultry carcasses suspended from shackles moving along a conveyor line but remaining attached to the carcasses by connective tissue, comprising:

separating means extending between the carcasses and the attached viscera packages along a portion of the conveyor line;

a secondary conveyor movable along an upper extent of the separating means in position to receive a portion of the connective tissue attaching the viscera packages to the carcasses, such that the viscera packages lie on one side of the separating means and the carcasses move along the other side of separating means;

a member aligned with the secondary conveyor in spaced apart relation thereto, with the spacing between the member and the secondary conveyor accommodating the nominal thickness of the connective tissue portion received on the secondary conveyor but preventing any of the viscera parts from moving laterally across the separating means as the secondary conveyor moves the connective tissue along the space between the separating means and the secondary conveyor;

guide means at the one side of the separating means and the secondary conveyor to define a path for the viscera package by intersecting each oncoming viscera package at a region joining the heart to the liver;

first cutting means positioned in relation to the guide means to sever the connective tissue connected to the heart, thereby separating the heart and lungs from the viscera package while the remainder of the viscera package is moved by the secondary conveyor; and second cutting means positioned alongside the secondary conveyor in position to sever the liver from the remainder of the viscera package, so that any remaining part of the viscera package can move beyond the secondary conveyor.

19. Apparatus as in claim 18, further comprising:

a pair of mutually-opposed helical rollers disposed to receive the heart and lungs separated from the viscera package and counter-rotatingly driven; and the helical rollers being operative to draw the lungs downwardly between the rollers while preventing the heart from undergoing such downward movement, so as to separate the lungs from the heart.

20. Apparatus as in claim 18, wherein the guide means at the one side of the secondary conveyor is laterally spaced apart from the secondary conveyor so as to maintain the liver between the secondary conveyor and the side of the guide means proximal to the secondary conveyor while the heart and lungs remain on the side of the guide means distal to the secondary conveyor.

21. Apparatus as in claim 20, wherein:
the first cutting means is on the proximal side of the secondary conveyor and at a first lateral distance from the secondary conveyor so as to sever the connective tissue extending from the liver to the heart through the path provided by the guide means; and
the second cutting means is at a second lateral spacing less than the first lateral spacing from the secondary conveyor.

22. Apparatus as in claim 18, wherein:
the guide means defining a product path comprises a pair of guide members disposed on the one side of the secondary conveyor in lateral spaced relation to the secondary conveyor;
the guide members being mutually spaced apart to provide a channel having an entry throat in the path of the oncoming viscera packages and of width sufficient to permit entry of the connective tissue joining the heart and lungs to the liver but not of the heart and lungs or the liver themselves,
so that the liver and the heart move along opposite sides of the channel as the viscera package is moved by the secondary conveyor.

23. Apparatus as in claim 22, wherein:
the first cutting means comprises a rotary knife adjacent one side of the guide members and operative to sever the connective tissue extending through the channel, so as to separate the heart and attached lungs from the viscera package.

24. Apparatus as in claim 23, wherein:
the second cutting means comprises a second rotary knife adjacent the one side of the secondary conveyor and operative to sever the liver from the connective tissue extending between the secondary conveyor and the member aligned with the secondary conveyor, so as to separate the liver from the remainder of the viscera package.

25. Apparatus as in claim 22, further comprising:
a ramp on the one side of the barrier in position to receive the viscera packages first received on the one side of the separating means and operative to direct the viscera packages toward the entry throat of the channel as the secondary conveyor moves the viscera package.

26. Apparatus as in claim 18, further comprising:
means exerting lateral force urging the carcasses laterally away from the separating means as the connective tissue received across the separating means moves along the secondary conveyor and the member aligned therewith,
so that the lateral force draws the viscera package into close proximity with the one side of the separating means and into predetermined alignment with the cutting means.

27. Apparatus as in claim 26, wherein the exerting means comprises a cam surface positioned for engagement by the shackle of the carcass conveyor as the carcass moves along the other side of the separating means and operative to displace the shackle laterally away from the separating means.

* * * * *